(12) United States Patent
Arsenie et al.

(10) Patent No.: US 10,484,253 B2
(45) Date of Patent: Nov. 19, 2019

(54) TOPOLOGY MAP UPDATE WITH SERVICE QUALITY INDICATORS

(71) Applicant: Hewlett Packard Enterprise Development LP, Houston, TX (US)

(72) Inventors: Crina Cristiana Arsenie, Mougins (FR); Jean Luc Richard, Mougins (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 86 days.

(21) Appl. No.: 15/419,353

(22) Filed: Jan. 30, 2017

(65) Prior Publication Data

US 2018/0219753 A1 Aug. 2, 2018

(51) Int. Cl.
| | |
|---|---|
| *H04L 12/58* | (2006.01) |
| *H04L 12/26* | (2006.01) |
| *H04L 12/24* | (2006.01) |
| *H04W 28/02* | (2009.01) |
| *H04L 12/751* | (2013.01) |
| *H04L 12/725* | (2013.01) |

(52) U.S. Cl.
CPC ............. *H04L 43/08* (2013.01); *H04L 41/12* (2013.01); *H04L 41/5009* (2013.01); *H04L 45/02* (2013.01); *H04L 45/302* (2013.01); *H04W 28/0268* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 8,255,524 B2 | 8/2012 | Devitt | |
| 9,209,943 B1 * | 12/2015 | Firoiu | .................. H04L 1/1607 |
| 2003/0103510 A1 * | 6/2003 | Svanberg | ............ H04L 12/4633 370/395.2 |
| 2010/0184425 A1 * | 7/2010 | Lee | ..................... H04L 41/0893 455/424 |
| 2011/0137714 A1 | 6/2011 | Bhandari et al. | |
| 2011/0166912 A1 | 7/2011 | Susumago | |
| 2012/0029977 A1 | 2/2012 | Alcorn et al. | |
| 2013/0159047 A1 | 6/2013 | Mayerle et al. | |
| 2014/0098820 A1 * | 4/2014 | Anantharam | .......... H04L 49/15 370/400 |
| 2014/0344024 A1 | 11/2014 | Kempf et al. | |

OTHER PUBLICATIONS

Mate, A. et al., "A Systematic Approach for Dynamic Targeted Monitoring of KPIS", Department of Computer Science, (Research Paper) Jan. 30, 2015, 15 pages.

(Continued)

*Primary Examiner* — Zewdu A Beyen
(74) *Attorney, Agent, or Firm* — Hewlett Packard Enterprise Patent Department

(57) ABSTRACT

Examples herein relate to monitoring network performance. For example, a system includes a topology map engine and service quality indicator (SQI) engine. The topology map engine develops a topology map representing multiple nodes irrespective of a type of domain. The SQI engine determines service quality indicators corresponding to the multiple nodes and updates the topology map with the service quality indicators.

13 Claims, 5 Drawing Sheets

(56) References Cited

OTHER PUBLICATIONS

Mullins, "HPE Vertica Analytics Platform" available online at <https://searchdatamanagement.techtarget.com/feature/Exploring-the-HPE-Vertica-Analytics-Platform>, 2016, 4 pages.

Hewlett Packard Enterprise, "UCA EBC V33 Documentation", 2016, available online at <https://softwaresupport.softwaregrp.com/web/softwaresupport/document/-/facetsearch/attachment/KM01985925?fileName=hp_man_UCAEBCIM3.3_Release_Notes_pdf.pdf>,14 pages.

Hewlett Packard Enterprise, "Customer Experience Assurance Solution", 2016, 8 pages.

Helwett Packard Enterprise, "HPE Service Director for vCPE 1.0 software", Data sheet, 2016, pp. 1-8.

Apache Storm, "Strom, Apache", available online at <https://web.archive.org/web/20161129114832/http://storm.apache.org/>, 2016, 4 pages.

Apache Spark, "Spark Apache", available online at <https://web.archive.org/web/20161229071653/http://spark.apache.org/>, 2016, 4 pages.

\* cited by examiner

TOPOLOGY MAP UPDATE WITH SERVICE QUALITY INDICATORS

BACKGROUND

Network monitoring includes the use of a system to monitor a network for degraded or failing components that may cause an outage or other such issues.

BRIEF DESCRIPTION OF THE DRAWINGS

In the accompanying drawings, like numerals refer to like components or blocks. The following detailed description references the drawings, wherein.

DETAILED DESCRIPTION

Figure 1:
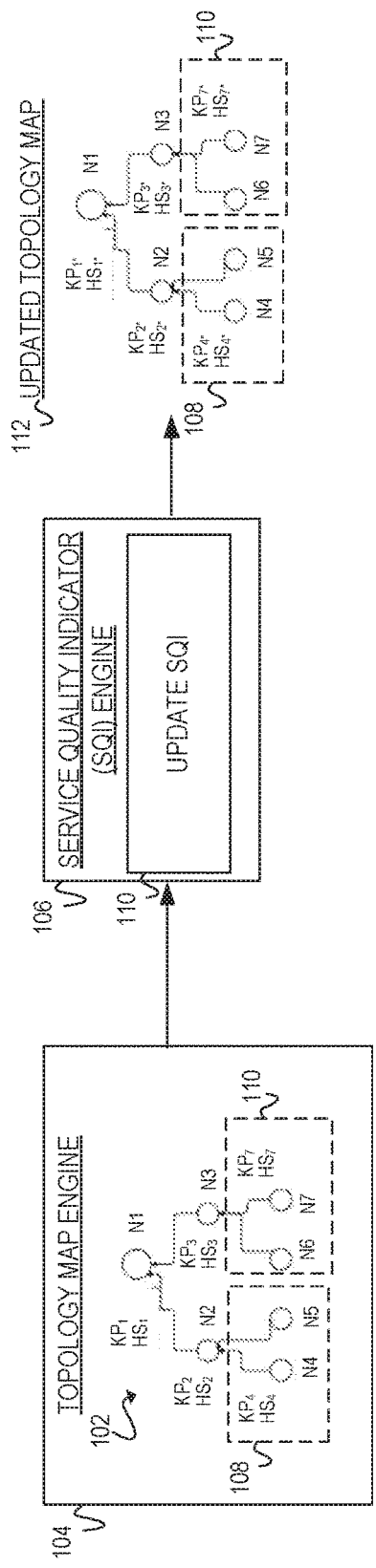
FIG. 1 illustrates an example system including a service quality indicator engine to update initial service quality indicators on a topology map in accordance with the present disclosure.

Networks have become increasingly heterogeneous and complex while network users have come to expect continuous network service. For example, networks may include many heterogeneous domains, such as physical network, virtual networks, etc. To adapt to the user's continuous service expectation, networks may encounter challenges to deliver the best quality of experience (QoE) at a reasonable operator expenditure (OPEX). As such, network monitoring and performance may become paramount to meet user's expectations. For this reason, key performance indicators (KPIs) are used to measure and evaluate the performance of existing network resources, such as nodes. Graph structures may be used to visually represent the nodes based on these KPIs.

One network monitoring approach uses the graph structure to represent the KPIs of various nodes in the network to predict future performance. However this approach uses static data and graphs to predict KPI degradations. Using static data is inefficient as the network may already be suffering a disruption due to the KPI degradation. Additionally, the static data may not be current and may not provide a fully accurate picture of the network. Other solutions may monitor network performance over a specific homogeneous domain. This solution is limited in the type of network monitoring as the solution may provide information on a portion of the network, but may not provide a holistic picture of the network. Yet, other solutions may monitor network performance by calculating only the KPIs and not other service indicators, such as health status. Calculating only KPIs may not provide a fully accurate picture of the network.

The present disclosure provides an efficient method to perform network monitoring among heterogeneous domains. The method develops a topology map for multiple nodes based in different types of domains. The topology map is updated in real-time which provides a more accurate picture of the network.

One implementation discloses a topology map representing multiple nodes based in heterogeneous domains. The topology map includes initial service quality indicators, such as the KPI and health status that corresponds to each of the multiple nodes. A service quality engine receives the topology map as input and updates the initial service quality indicators. The initial service quality indicators is based on previously collected metrics or measurements of the multiple nodes. As such, updating the KPI and health status from newly collected metrics provides the most up to date information on the topology map. Through the collection of metrics and continuously updating the SQIs corresponding to the multiple nodes, the implementation provides a dynamic loop of continuously updating the topology map and SQIs in real-time. As such, the metrics may be continuously collected and evolved to update the SQIs over time.

In another implementation through the updated SQIs, the system detects a degradation or other performance issue at a given node. Based on the detection, the system may proceed to perform an action to prevent further performance issues. Updating the SQIs to detect any performance or degradation issues offers a closed loop between the SQI engine and the topology map engine so issues may be detected through the updated SQIs and reactive and/or proactive measures may be performed.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for detecting a coolant leak via a resistance measurement. The disclosed examples may include systems, devices, computer-readable storage media, and methods for detecting the coolant leak. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

FIG. 1 illustrates an example system for monitoring network performance in a network. The system includes topology map engine 104 to develop topology map 102. Topology map 102 represents multiple nodes based in heterogeneous domains 108 and 110. Additionally, topology map 102 includes initial service quality indicators (SQIs), such a key performance indicator (KPI) and health status (HS) for each node. Based on topology map engine 104 developing topology map 102, service quality indicator (SQI) engine 106 receives topology map 102 and in turn, updates the SQI at module 110. SQI engine 106 provides the updated SQI obtained at module 110 to produce updated topology map 112. Producing the updated SQIs and providing an updated topology map 112 offers a closed loop between topology map engine 104 and SQI engine 106 to such that the system can detect issues through the updated SQIs.

In one implementation, the system in FIG. 1 represents a network, such a telecommunications network that comprises multiple types of domains. As such, the network includes a collection of multiple nodes linked together to provide communications between various subscribers (not illustrated). For example, the system may include a communication service provider specific network. The network represented in FIG. 1 may be very vast and complex as the nodes within the network may include a number of equipment, physical resources, and/or virtual resources. Implementations of the network includes, by way of example, a telecommunications network, wide area network, legacy network, local area network (LAN), optic cable network software defined network, or some other type of communication network.

Topology map engine 104 is a component to develop and evolve topology map 102 over time. In one implementation, topology map engine 104 collects metrics over each of the multiple nodes and caches the metrics for a limited period of time. In this implementation, topology map engine 104 includes a storage component (not illustrated) which caches the metrics corresponding to the multiples nodes based in heterogeneous domains 108 and 110. The collected metrics are measurements regarding the status, activity, and/or functionality for a given node. As such, the metrics may be received for the given domain. In an implementation, topology map engine 104 aggregates the collected metrics for the given node to update the SQI for that given node. In this manner, the collected metrics may be used to determine the initial SQIs on the topology graph. The metrics may change and evolve over time for the given node. As such, the metrics may be collected continuously to evolve and update the SQIs over time. Implementations of topology map engine 104 include, electronic circuitry (i.e., hardware) that implements the functionality of the processing engine 108, such an integrated circuit, programmable circuit, application integrated circuit (ASIC), controller, processor, semiconductor, processing resource, chipset, or other type of hardware component capable of the functionality of topology map engine 104. Alternatively, topology map engine 104 may include instructions (e.g., stored on a machine-readable medium) that, when executed by a hardware component (e.g., controller and/or processor), implements the functionality of topology map engine 104.

Topology map 102 represents a graph structure that represents an arrangement of the multiples nodes based in heterogeneous domains 108 and 110 and the initial SQIs ($KP_1$, $HS_1$, $KP_2$, $HS_2$, $KP_3$, $HS_3$, $KP_4$, $HS_4$, $KP_7$, $HS_7$). The initial SQIs are developed by topology map engine 104 from metrics previously collected at an earlier point in time. As such, initial SQIs may be updated by SQI engine 106 and represented on topology map 102 to illustrate the changes in SQIs over time. Additionally, topology map 102 illustrates the relationships between the multiple nodes. These relationships may also affect the updated SQIs on updated topology map 112. In this implementations, the relationship information identifies those nodes that are adjacent to the given node that may be suffering a failure. The given failing node may affect the operations of the adjacent nodes, thus affecting the updated SQIs. For example, node 1 (N1) is adjacent to nodes 2 and 3 (N2-N3). As such, if node 1 suffers a failure, this may affect the operations and thus the updated SQIs for nodes 2 and 3 as calculated by SQI engine 106. This is explained in detail later in the figure. Topology map 102 is a means of providing a structured representation of knowledge to multiple nodes across different types of domains. As such, topology map 102 may include a graph, ontology, structure, chart, or other type of representation of multiple nodes across different types of domains.

Heterogeneous domains 108 and 110 are areas of service for a given network that includes the equipment, physical, and/or virtual resources. Heterogeneous domains 108 and 110 are each considered different type of domain which comprise the given network in FIG. 1. The types of domains may include, by way of example, a physical domain such as switching domain, a virtual domain, and/or software-defined domain. For example, assume domain 108 includes a physical domain, then domain 110 may include another type of domain, such as virtual domain. Each heterogeneous domain 108 and 110 includes multiple nodes that represent the equipment, physical, and/or virtual resources within the given network. SQI engine 106 may monitor these nodes within heterogeneous domains 108 and 110 to detect degradation issues. For example, nodes 4 and 5 (N4 and N5) may be located in the physical domain while nodes 6 and 7 (N6 and N7) are located in the virtual domain. The remaining nodes (N1-N3) may be based in either node or in a third type of domain.

SQI engine 106 receives topology map 102 from topology map engine 104 and in turn updates the initial SQIs to provide updated topology map 112. In another implementation SQI engine 106 receives the collected metrics to update SQIs. In this implementation, SQI engine 106 includes a memory in which to cache the collected metrics for a limited period of time. SQI engine 106 uses the collected metrics to update the SQIs for each node to provide updated topology map 112. In a further implementation, SQI engine 106 receives instances specific to a communication service provider's network. These instances may include data, relationships, and/or objects specific to the given network. Implementations of SQI engine 106 include, electronic circuitry (i.e., hardware) that implements the functionality of SQI engine 106, such as an integrated circuit, programmable circuit, application integrated circuit (ASIC), controller, processor, semiconductor, processing resource, chipset, or other type of hardware component capable of the functionality of SQI engine 106. Alternatively, SQI engine 106 may include instructions (e.g., stored on a machine-readable medium) that, when executed by a hardware component (e.g., controller and/or processor), implements the functionality of SQI engine 106.

At module 110, SQI engine 106 updates the initial SQIs on topology graph 102. In this implementation, SQI engine 106 aggregates the collected metrics to generate an updated KPI for each node. Upon updating the KPI, SQI engine 106 proceeds to define a threshold to determine an updated health status for each node. These updated SQIs produced at module 110 are used to develop updated topology map 112. The module 110 may include, by way of example, instructions (e.g., stored on a machine-readable medium) that, when executed (e.g., by SQI engine 106), implement the functionality of module 110. Alternatively, or in addition, module 110 may include electronic circuitry (i.e., hardware) that implements the functionality of module 110.

Updated topology map 112 represents topology map 102 developed by topology map engine 104 with updated SQIs ($KP_{1*}$, $HS_{1*}$, $KP_{2*}$, $HS_{2*}$, $KP_{3*}$, $HS_{3*}$, $KP_4$, $HS_4$, etc.) for each respective node (N1, N2, N3, N4, N5, N6, N7). The nodes are based in heterogeneous domains 108 and 110. The network uses the updated SQIs in updated topology map 112 to detect potential failures and/or degradations and triggers a proactive or reactive measure to prevent additional issues. For example, assuming node 1 (N1) is suffering a failure, the network may proceed to interrupt operation at that failed node to prevent failure from spreading to the adjacent nodes (N2-N3). In a further implementation, the updated topology map with the updated SQIs may be used to continuously collect metrics and continually update the SQIs.

For example, topology map 102 includes initial SQIs ($KP_1$, $HS_1$, $KP_2$, $HS_2$, $KP_3$, $HS_3$, $KP_4$, $HS_4$, etc.). In this example the key performance indicator for each node is represented by KP,' and the health status of each node is represented by 'HS.' SQI engine 106 receives topology map 102 and updates the initial SQIs based on collected metrics over each node (N1, N2, N3, N4, etc.). Thus based on the metrics for each node changing overtime, the updated SQIs ($KP_{1*}$, $HS_{1*}$, $KP_{2*}$, $HS_{2*}$. $KP_{3*}$, $HS_{3*}$, $KP_4$, $HS_4$, etc.) also change as represented with asterisk (*) on updated topology map 112. In this regard, the updated SQIs are provided on topology map 112 to illustrate the changes in the SQIs over time based on the changes in the metrics over each node. Although FIG. 1 illustrates the SQIs (e.g., KP and HS) for a limited number of nodes (N1, N2, N3, N4, and N7) this was done for illustration purposes and not for purposes for limitation. Alternatively, the SQIs are not illustrated for nodes 5-6 this was done for illustration purposes. For example, nodes (N5 and N6) may further include their respective SQIs.

Figure 2:
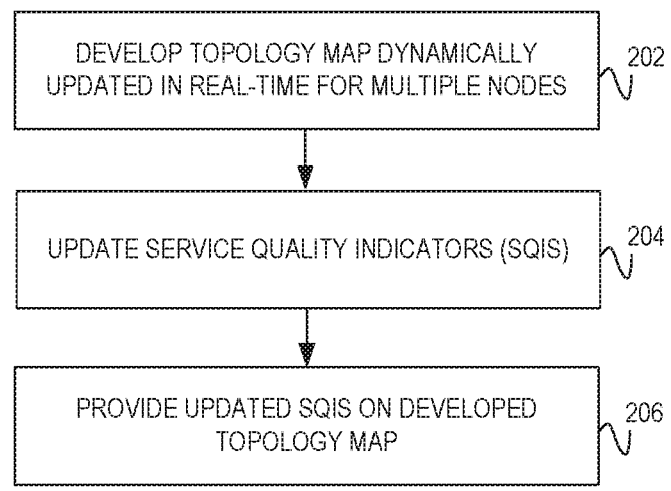
FIG. 2 illustrates an example flow diagram to develop a topology map and provide updated service quality indicators on the topology map in accordance with the present disclosure.
Figure 3:
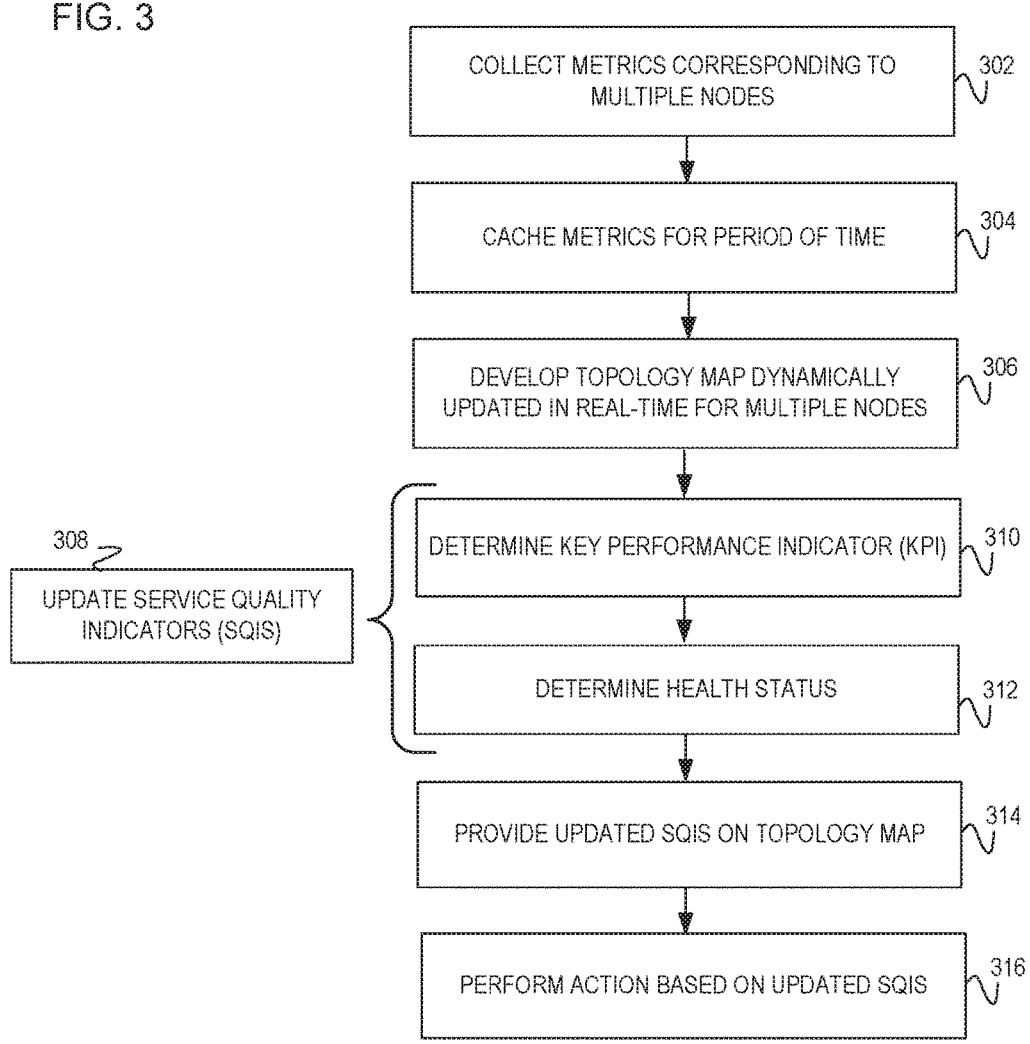
FIG. 3 illustrates an example flow diagram to perform an action based on updated service quality indicators provided on a topology map in accordance with the present disclosure.

Referring now to FIGS. 2 and 3, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flow diagram illustrating a method of providing updated service quality indicators (SQIs) on a developed topology map. The method is executable by a computing device as illustrated in connection with previous figures. The computing device develops a topology map that represents multiple nodes based in heterogeneous domains. The topology map is dynamically updated in real-time based on collected metrics that report information on the multiple nodes based in the heterogeneous domains. From the developed topology map, the computing device may proceed to update the SQIs corresponding to the multiple nodes. Based on updating the SQIs corresponding to the multiple nodes, the computing device provides the updated SQIs on the topology map. Through the collection of metrics and continuously updating the SQIs corresponding to the multiple nodes, the computing device provides a dynamic loop of continuously updating the topology map and SQIs in real-time. In discussing FIG. 3, references may be made to the components in FIG. 1 to provide contextual examples. In one implementation, SQI engine 106 as in FIG. 1 executes operations 202-206 to update the SQIs corresponding to the multiple nodes and provide the updated SQIs on the topology map. In another implementation, topology map engine 104 and SQI engine 106 operate in conjunction to execute operations 202-206. Although FIG. 2 is described as implemented by SQI engine 106, it may be executable on other suitable hardware components. For example, FIG. 2 may be implemented in the form of executable instructions on a machine-readable storage medium 404 and 504 as in FIGS. 4-5.

At operation 202, the computing device develops the topology map. Developing the topology map includes collecting metric information, relationships, and/or objects for each of the multiple nodes. The collected metrics are the measurements of information regarding each of the multiple nodes. The collected metrics are used to build the information map of each of the nodes. Examples of metric information may include, by way of example, amount of traffic at a given node, function of the given node, users at the given node, bandwidth of node, events at the given node, indications of a failure of the given node, successful indications at the given node, and the list goes on. These metrics may be infinite in number and as such, there metrics are continuously collected to determine the service quality indicators. In a more specific implementation, the metrics are collected from nodes within a virtual network and physical network. Continuously collecting metrics about each of the nodes enables an update to the topology map for the multiple nodes. In a further implementation, the computing device receives relationship information over the nodes and/or network specific information prior to updating SQIs. The relationship information identifies those adjacent nodes to the given node that may affect the operation of the given node. For example, assume an adjacent node is suffering a failure, this may affect the operation of the given node as the given node may increase its operation to cover the failed node or may also suffer a failure. Yet, in a further implementation, the collected metrics are aggregated to identify the service quality indicators as at operation 204.

At operation 204, the computing device updates the multiple SQIs corresponding to the multiple nodes. In this implementation, each updated SQI corresponds to each node. As such, the node includes a respective SQI. In another implementation, each SQI includes both a key performance indicator (KPI) and a health status. In this implementation, the metrics collected at operation 302 are aggregated for each of the nodes to update the KPI. The computing device may proceed to set a threshold related to the KPI, so the health status for each of the nodes may then be obtained. Using the KPI and the health status for each of the nodes provides a more holistic approach to the nodes in the heterogeneous domains. The SQIs may be updated according to collected metrics. In this implementation, the SQIs may be on the topology map but may be updated according to the collected metrics. As such, changes in the collected metrics would be reflected with the updated SQIs. In response to updating the multiple SQIs, the computing device provides the updated SQIs on the topology map.

At operation 206, based on updating the SQIs, the computing device provides the updated service quality indicators on the topology map. Providing the updated SQIs may include overlaying the updated SQIs on the topology map and/or outputting the updated topology map. In another implementation, based on the updated SQIs on the topology map, the computing device may trigger an action to perform at the given node. The action may be related to taking a proactive and/or reactive action in response to the updated SQIs. For example, assume the updated SQI (e.g, KPI, health status) indicates the given node is suffering a failure. The computing device may proceed to interrupt operation at the given node to prevent the failure from spreading to the adjacent nodes. In a further implementation, the updated topology map with the updated SQIs may be used to continuously collect metrics and continually update the updated SQIs. In this manner, the updated topology map serves as a closed loop to present the most up to date information over the multiple nodes in the heterogeneous domains.

FIG. 3 is a flow diagram illustrating a method of collecting metrics to update SQIs on a topology map and in response performing an action based on the update SQIs. The method is executable by a computing device as illustrated in connection with previous figures. The computing device collects metrics corresponding to multiple nodes. The multiple nodes are based in heterogeneous domains. The heterogeneous domains are different types of domains, such a virtual domain and/or physical domain that comprises a network. Based on collecting metrics, the computing device proceeds to cache the metrics for a limited period of time. The collected and cached metrics are used to develop the topology map. The topology map represents the multiple nodes within the heterogeneous domains and the relationships between the multiple nodes. Based on the developed topology map, the computing device proceeds to update the SQIs. Updating the SQIs includes updating the key performance indicator (KPI) and the health status for each of the multiple nodes. Using the updated KPI and health status, the computing device proceeds to provide the updated KPI and health status for each node on the topology map. In response to providing the updated KPI and health status for each node on the topology map, the computing device proceeds to perform an action based on the updated KPI and/or health status. For example, the action may include a proactive or reactive measure based on the KPI and/or health status for a given node. In discussing FIG. 3, references may be made to the component in FIG. 1 to provide contextual examples.

In one implementation, SQI engine 106 as in FIG. 1 executes operations 302-316 to update the SQIs corresponding to the multiple nodes and provide the updated SQIs on the topology map. In another implementation, topology map engine 104 and SQI engine 106 operate in conjunction to execute operations 302-316. Although FIG. 3 is described as implemented by SQI engine 106, it may be executable on other suitable hardware components. For example, FIG. 3 may be implemented in the form of executable instructions on a machine-readable storage medium 404 and 504 as in FIGS. 4-5.

At operation 302, the computing device collects the metric information regarding the multiple nodes. As explained in connection with earlier figures, the collected metrics are measurements regarding the status, activity, and/or functionality for a given node. As such, the metrics may be received from each node, each domain, and/or a management device for the given domain. The collected metrics are used to determine the initial SQIs on the topology graph. As such, the metrics may be collected continuously to evolve and update the SQIs over time. In other implementations, the computing device retrieves the metrics from each node and/or management device. In another implementation upon collecting the metric information, the metrics may be cached in a storage for a limited period of time as at operation 304.

At operation 304 based on the metric collection, the computing device caches the metrics for a limited period of time. The cache is a storage area local to the computing device that continuously caches updated metrics to provide up-to-date information to dynamically adjust the respective SQIs. The metrics may be cached for the limited period of time, thus allowing incoming metrics to be cached. As such, the computing device will have the most up to-date information to update the SQIS on the topology graph.

At operation 306, the computing device proceeds to develop the topology map. The topology may include the initial SQIs, such as the KPI and health status for each node based on previously collected metrics. As such, the metrics collected at operation 302 are used to update the topology map. In this implementation, the computing device proceeds to update the KPI and health status based on the metrics collected at operation 302. Operation 306 may be similar in functionality to operation 202 as in FIG. 2.

At operation 308, the computing device updates the initial SQIs based on the collected metrics from operation 302. The initial SQIs may include the KPI and health status for each node in the different domains and as such, computing device proceeds to update the initial KPI and the initial health status for each node at operations 310-312. Operation 308 may be similar in functionality to operation 204 as in FIG. 2.

At operation 310, the computing device determines the KPI for each of the multiple nodes. In this implementation, the computing device aggregates the metrics corresponding to each node. The computing device uses the cached metrics for each node and aggregates together to update the KPI. Upon updating the KPI, the computing device proceeds to determine the health status for each node as at operation 312.

At operation 312, upon updating the KPI, the computing device proceeds to update the health status for each node. In this implementation, the computing device defines a threshold value. Using the updated KPI value, the computing device determines if that KPI value is above or below a particular threshold. Where the KPI value lands against the threshold value, indicates the health status of the node. The health status indicates the state of the node, such as whether the node is suffering a failure or within normal operation.

Operation 314, the computing device proceeds to provide the updated KPI and health status corresponding to each node on the topology map. Providing the updated KPI and health status may include overlaying this information and/or adjusting the topology map based on the updated information. Other implementations include outputting and/or rendering the updated topology map.

At operation 316, based on the updated KPI and the health status for the given node, the computing device may detect whether the given node is suffering degradation issues. As such, the actions may include a proactive or reactive measurement to prevent further degradation within a system.

Figure 4:
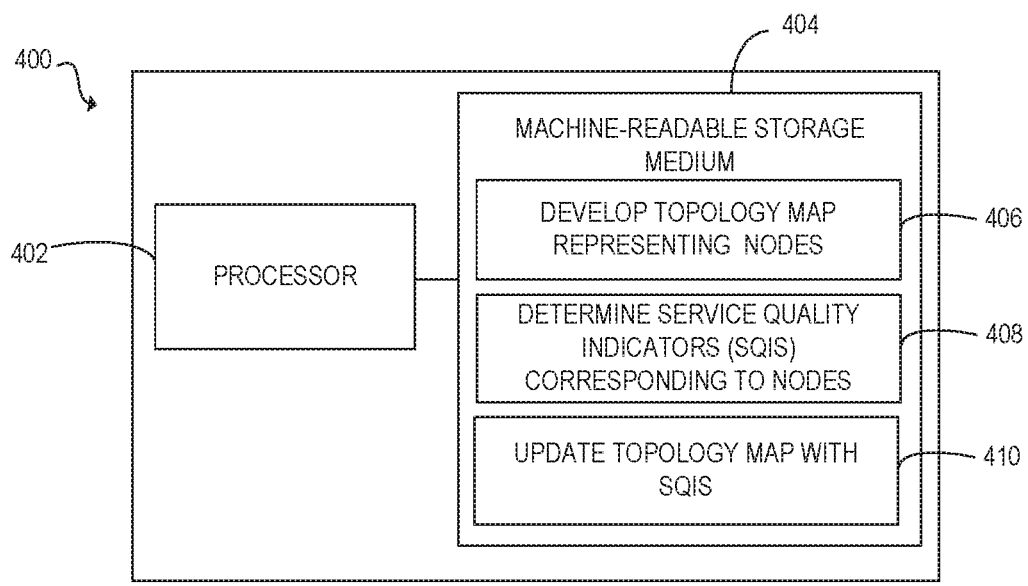
FIG. 4 is a block diagram of an example computing device with a processing resource to execute instructions in a machine-readable storage medium for providing an updated service quality indicator on a topology map in accordance with the present disclosure.
Figure 5:
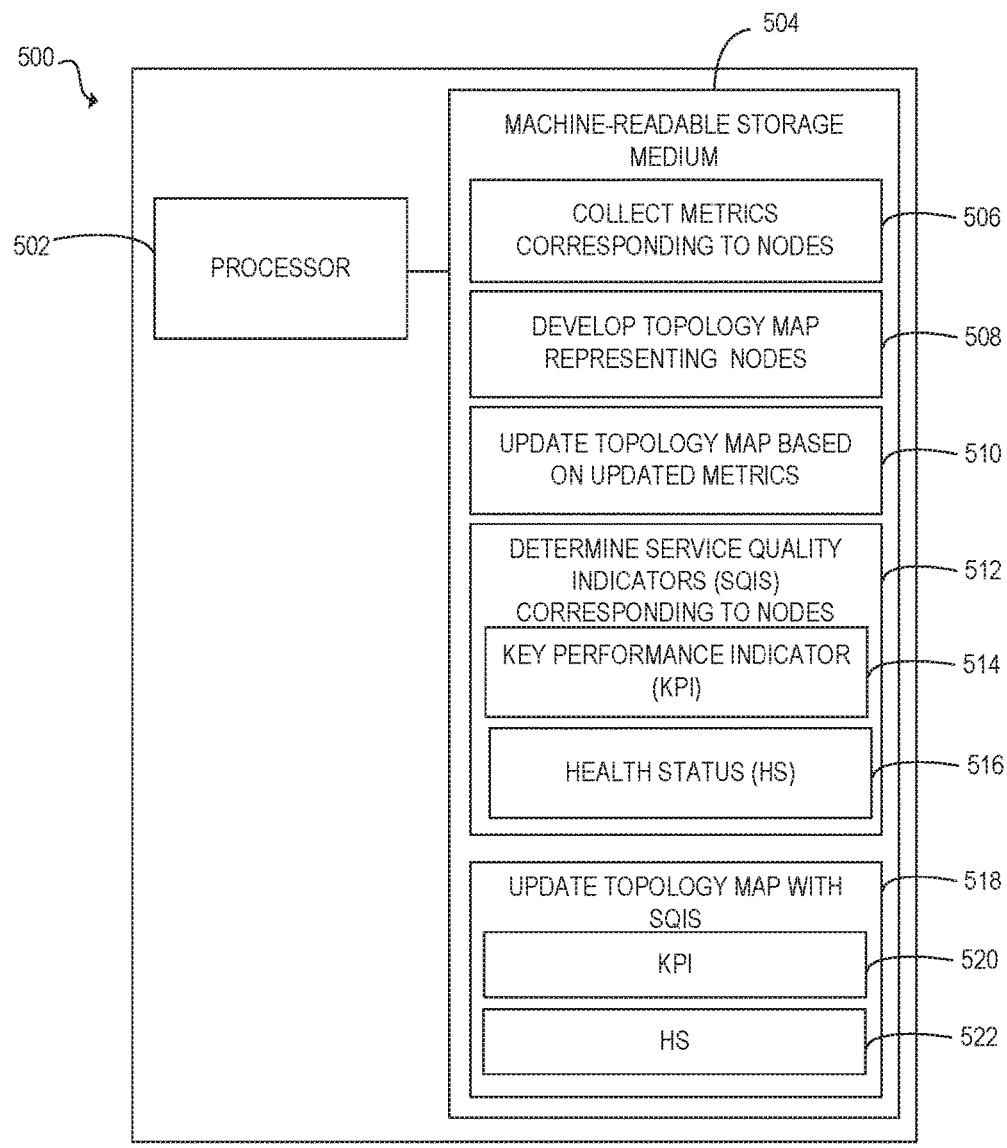
FIG. 5 is a block diagram of an example computing device with a processing resource to execute instructions in a machine-readable storage medium for updating a key performance indicator and health status for each of multiple nodes based in heterogeneous domains in accordance with the present disclosure.

Referring now to FIGS. 4-5, example block diagrams of computing devices 400 and 500 with processing resources 402 and 502 are illustrated to execute machine-readable instructions in accordance with various examples of the present disclosure. The machine-readable instructions represent instructions that may be fetched, decoded, and/or executed by respective processing resources 402 and 502. While illustrated in a particular order, these instructions are not intended to be so limited. Rather, it is expressly contemplated that various instructions may occur in different orders and/or simultaneously with other instructions than those illustrated in FIGS. 4-5.

FIG. 4 is a block diagram of computing device 400 with processing resource 402 to execute instructions 406-410 within machine-readable storage medium 404. Although computing device 400 includes processing resource 402 and machine-readable storage medium 404, it may also include other components that would be suitable to one skilled in the art. For example, computing device 400 may include a controller, memory storage, or other suitable type of component. The computing device 400 is an electronic device with processing resource 402 capable of executing instructions 406-410 and as such embodiments of the computing device 400 include a networking device such as a server, switch, router, wireless access point (WAP), or other type of networking device or embodiments of the computing device 400 include an electronic device such as a computing device, or other type of electronic device capable of executing instructions 406-410. The instructions 406-410 may be implemented as methods, functions, operations, and other processes implemented as machine-readable instructions stored on the storage medium 404, which may be non-transitory, such as hardware storage devices (e.g., random access memory (RAM), read only memory (ROM), erasable programmable ROM, electrically erasable ROM, hard drives, and flash memory).

The processing resource 402 may fetch, decode, and execute instructions 406-410 to update a topology map with service quality indicators corresponding to multiple nodes based in heterogeneous domains. Specifically, the processing resource 402 executes instructions 406-410 to: develop the topology map representing multiple nodes based in heterogeneous domains (e.g., different types of domains); determine service quality indicators corresponding to the multiple nodes; and update the topology map with the determine service quality indicators.

The machine-readable storage medium 404 includes instructions 406-410 for the processing resource 402 to fetch, decode, and execute. In another embodiment, the machine-readable storage medium 404 may be an electronic, magnetic, optical, memory, storage, flash-drive, or other physical device that contains or stores executable instructions. Thus, machine-readable storage medium 404 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 404 may include an application and/or firmware which can be utilized independently and/or in conjunction with processing resource 402 to fetch, decode, and/or execute instructions of machine-readable storage medium 404. The application and/or firmware may be stored on machine-readable storage medium 404 and/or stored on another location of computing device 400.

FIG. 5 is a block diagram of computing device 500 with processing resource 502 to execute instructions 506-522 within machine-readable storage medium 504. Although computing device 500 includes processing resource 502 and machine-readable storage medium 504, it may also include other components that would be suitable to one skilled in the art. For example, computing device 500 may include a controller, memory storage, or other suitable type of component. The computing device 500 is an electronic device with processing resource 502 capable of executing instructions 506-522 and as such embodiments of the computing device 500 include a networking device such as a server, switch, router, wireless access point (WAP), or other type of networking device or embodiments of the computing device 500 include an electronic device such as a computing device, or other type of electronic device capable of executing instructions 506-522. The instructions 506-522 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-522 to update a topology map with service quality indicators, such as a key performance indicator (KPI) and health status for each of the corresponding multiple nodes based in heterogeneous domains corresponding to multiple nodes based in heterogeneous domains. Specifically, the processing resource 502 executes instructions 506-522 to: collect metrics that correspond to information from each of the multiple nodes; develop a topology map representing multiple nodes based in heterogeneous domains (e.g., different types of domains), the topology map may include pre-configured KPI and health status for each node; continuously collect metrics and update the topology map based on the newly collected metrics; determine service quality indicators corresponding to the multiple nodes, the service quality indicators including the updated KPI and updated health status for each of the multiple nodes; and update the topology map with the updated KPI and the updated health status.

The machine-readable storage medium 504 includes instructions 506-522 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of computing device 500.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A system to monitor network performance, the system comprising:
    a processor;
    a non-transitory computer-readable storage medium storing code that the processor is to execute to:
        collect metrics corresponding to multiple nodes based in heterogeneous domains;
        for each node, determine a key performance indicator (KPI) by aggregating the collected metrics;
        for each node, set a health status based on whether the determined KPI for the node is greater or less than a threshold;
        develop and display a topology map based on the collected metrics, the topology map including a visual representation of the multiple nodes and service quality indicators for the multiple nodes, the service quality indicators including the KPIs and the health statuses for the nodes;
        collect updated metrics corresponding to the multiple nodes;
        update the service quality indicators for the multiple nodes from the collected updated metrics; and
        provide a visual of the updated service quality indicators on the displayed topology map.

2. The system of claim 1 wherein the multiple nodes are based in different types of domains.

3. The system of claim 1 wherein to update the topology map with the service quality indicators, the processor is to:
    receive input specific to a telecommunications network; and
    update the service quality indicators in real-time.

4. The system of claim 1, wherein the service quality indicator for a given node of the multiple nodes is based on whether an adjacent node of the multiple nodes is failing.

5. The system of claim 1, wherein the processor is further to:
    detect that a given node of the multiple nodes is failing from the updated service quality indicators;
    responsively prevent failure of the given node from spreading to adjacent nodes by interrupting operations of the given node.

6. A method to perform network monitoring among heterogeneous domains, the method comprising:
    collecting metrics corresponding to multiple nodes based in heterogeneous domains;
    for each node, determining a key performance indicator (KPI) by aggregating the collected metrics;
    for each node, setting a health status based on whether the determined KPI for the node is greater or less than a threshold;
    developing and displaying a topology map dynamically updated in real-time for the multiple nodes according to multiple respective service quality indicators, the service quality indicators including the KPIs and the health statuses for the nodes;
    collecting updated metrics corresponding to the multiple nodes;
    updating the multiple respective service indicators corresponding to the multiple nodes from the collected updated metrics; and
    providing a visual of the updated multiple respective service quality indicators on the developed and displayed topology map.

7. The method of claim 6 wherein developing the topology map dynamically updated in real-time for the multiple nodes according to the multiple respective service quality indicators for the multiple nodes based in the heterogeneous domains comprises:
    caching the collected metrics for a limited period of time.

8. The method of claim 6 comprising:
    performing an action in response to the updated multiple respective service quality indicators.

9. The method of claim 6 wherein the heterogeneous domains includes at least a physical network and at least a virtual network.

10. A non-transitory machine-readable storage medium comprising instructions that when executed by a processing resource cause a computing device to:
    collect metrics corresponding to multiple nodes based in heterogeneous domains;
    for each node, determine a key performance indicator (KPI) by aggregating the collected metrics;
    for each node, set a health status based on whether the determined KPI for the node is greater or less than a threshold;
    develop and display a topology map representing the multiple nodes and service quality indicators for the multiple nodes, the service quality indicators including the KPIs and the health statuses for the nodes;
    collect updated metrics corresponding to the multiple nodes;
    updating the service quality indicators based on the collected updated metrics; and
    update the displayed topology map by providing a visual of the service quality indicators on the displayed topology map.

11. The non-transitory machine-readable storage medium of claim 10 wherein to determine the service quality indicators corresponding to the multiple nodes based in heterogeneous domains comprises instructions that when executed by the processing resource cause the computing device to:
    collect metrics corresponding to the multiple nodes;
    determine a key performance indicator for each of the multiple nodes via aggregation of the collected metrics; and
    determine a health status for each of the multiple nodes based on the key performance indicator; and
    update the topology map with the key performance indicator and the health status for each of the multiple nodes.

12. The non-transitory machine-readable storage medium of claim 10 wherein to develop the topology map representing multiple nodes based in heterogeneous domains comprises instructions that when executed by the processing resource cause the computing device to:

dynamically update in real-time the topology map via metric collection over each of the nodes.

13. The non-transitory machine-readable storage medium of claim 10 wherein a quality service indicator for a given node is based on an adjacent node to the given node.

* * * * *